Dec. 5, 1933.   H. T. LAMBERT   1,938,030
SWIVELED WHEEL AND AXLE THEREFOR
Filed Jan. 25, 1928   3 Sheets-Sheet 1
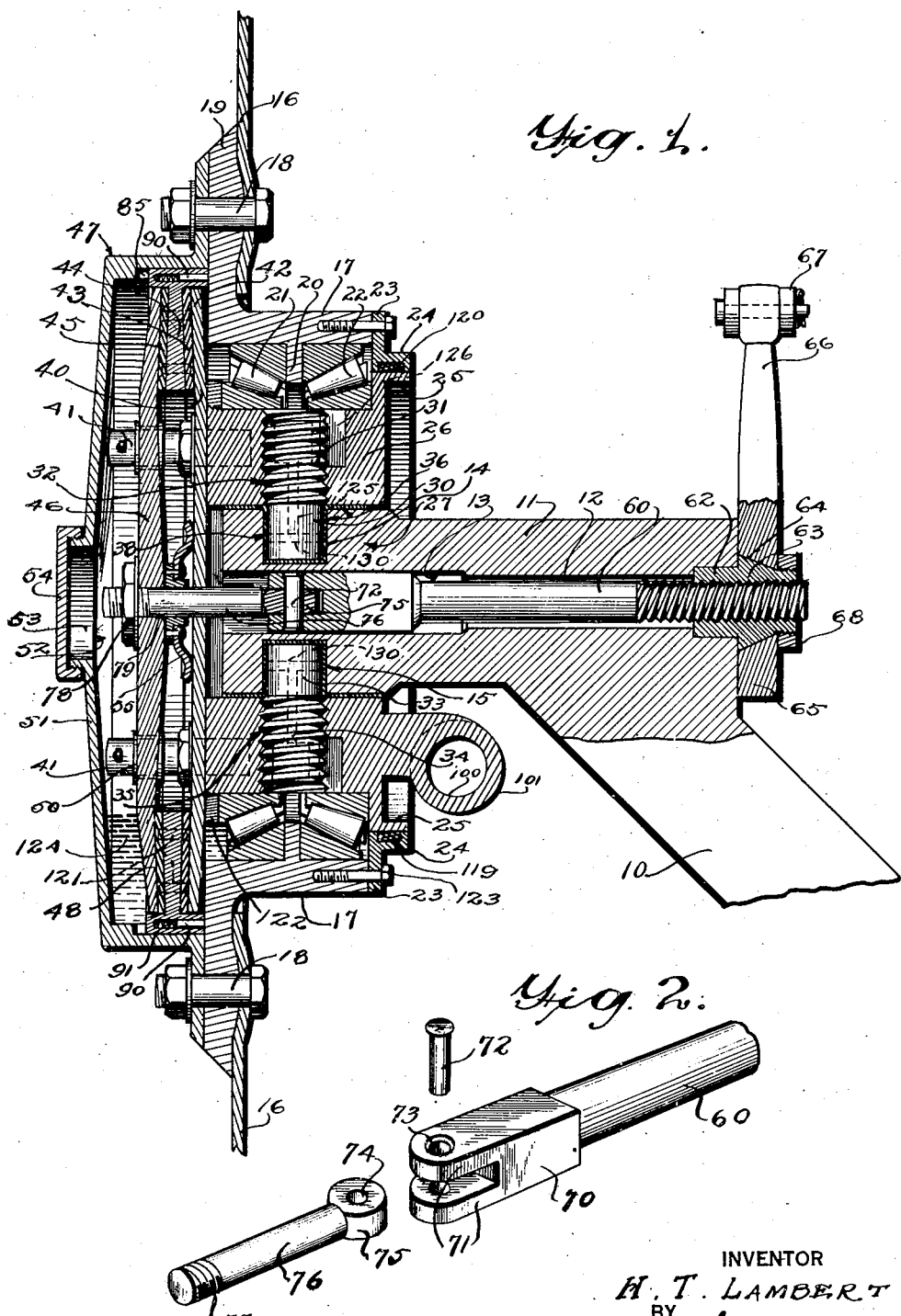
INVENTOR
H. T. LAMBERT
BY
ATTORNEY Dec. 5, 1933.    H. T. LAMBERT    1,938,030
SWIVELED WHEEL AND AXLE THEREFOR
Filed Jan. 25, 1928    3 Sheets-Sheet 2
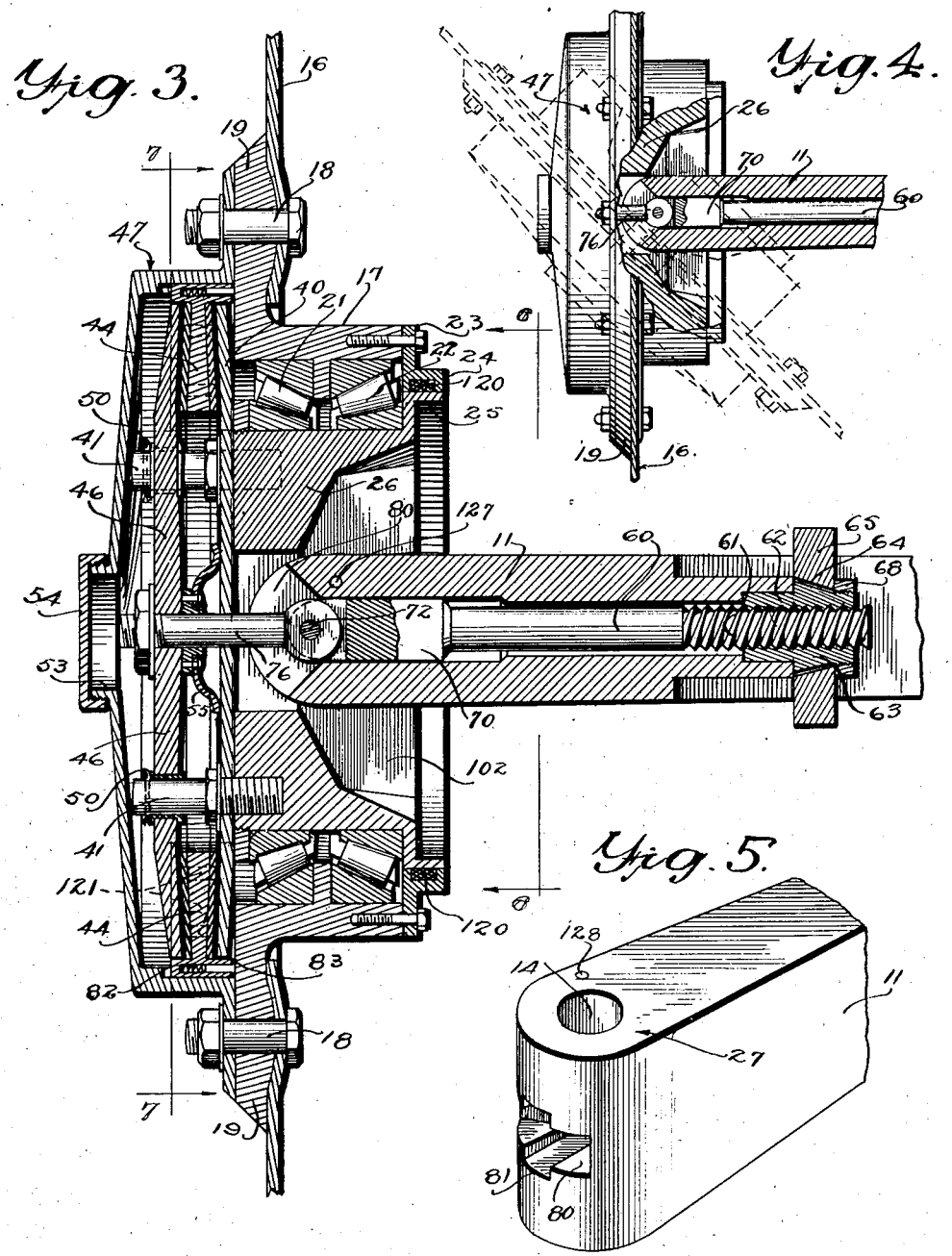
INVENTOR
H. T. LAMBERT
BY
ATTORNEY Dec. 5, 1933.  H. T. LAMBERT  1,938,030
SWIVELED WHEEL AND AXLE THEREFOR
Filed Jan. 25, 1928   3 Sheets-Sheet 3

INVENTOR
H. T. LAMBERT.
BY
ATTORNEY

Patented Dec. 5, 1933

1,938,030

UNITED STATES PATENT OFFICE 1,938,030

SWIVELED WHEEL AND AXLE THEREFOR

Homer T. Lambert, Huntington, W. Va.

Application January 25, 1928. Serial No. 249,331

7 Claims. (Cl. 280—96.3)

This invention relates to improvements in the swiveled or steering carrier wheels of vehicles, and more particularly to such as are especially adapted for automobiles and like constructions. Among the objects in view are effectiveness and dependability of operation, ease of accessibility, simplicity and inexpensiveness of construction, and adaptability for cooperative use with an external brake of the type set forth in my co-pending, divisional application filed on the 22nd day of March, 1930, Serial No. 438,222, now Patent No. 1,831,125, dated November 10, 1931.

It is also an important object of the invention to provide such swivel construction for a carrier wheel journal as to enable the journal to directly surround and be pivoted to a rigid axle portion.

A further object is the elimination of the conventional stub axle for purposes of swiveling the carrier wheel, and as an additional object incident thereto, the invention largely eliminates defects arising from torsional strains and resulting pinching and wear of king pins and like bearings and bushings therefor commonly utilized in conjunction with stub axles.

A still further object of the present invention is to increase the area of the bearing surface through which load stresses are transmitted for reducing the shock incident to such transmission.

With these and further objects in view as will in part hereinafter become apparent and in part be stated, the invention includes a load-carrying axle, a bearing hub directly mounted on and swiveled to a rigid part of said axle, and a carrier wheel journaled on said swiveled hub.

The invention also includes a relatively large bearing surface for the load-transmitting portions of the swiveled hub in its engagement with the axle, whereby load stresses are delivered and distributed with minimum shock and substantially free from such binding action as tends to occur in the operation of stub axle swivels.

The invention also comprises certain other novel constructions, combinations, and arrangements of parts as subsequently specified and claimed.

In the accompanying drawings,—

Figure 1 is a vertical section through a swiveled wheel and braking mechanism incorporating an embodiment of the present invention, the section being taken on a plane substantially along the axis of rotation of the wheel, parts being shown in elevation.

Figure 2 is a perspective view of the connecting means for the brake actuator detached, and having the parts segregated for clearness of disclosure, parts being broken away.

Figure 3 is a view similar to Figure 1 taken at right angles to the plane of the section of Figure 1, being a horizontal section, and parts being seen in plan.

Figure 4 is a sectional plan of the parts seen in Figures 1 and 3, parts being broken away and shown in section for disclosing interior structure, the parts being seen on a reduced scale.

Figure 5 is an enlarged, fragmentary perspective view of a portion of the end of the axle.

Figure 6:
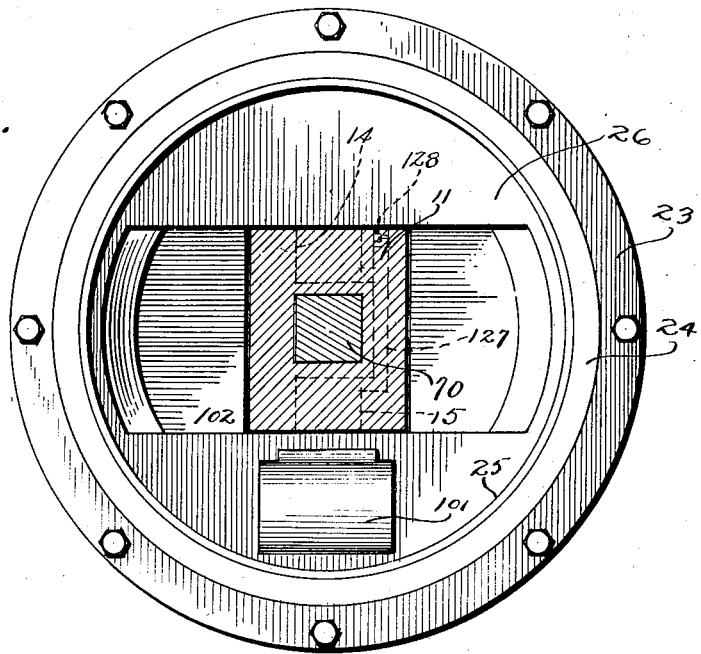
Figure 6 is a vertical section taken on the plane indicated by line 6—6 of Figure 3, looking in the direction of the arrow, parts being seen in elevation.

While the brake mechanism hereinafter described in detail is claimed in my co-pending, divisional application above identified, it will become apparent that the structures of this application are especially designed to cooperate with, accommodate, and accentuate the utility of such brake structure.

Referring to the drawings by numerals, 10 indicates a load-supporting axle, one common form of concrete application of which is the front axle of an automobile. Axle 10, however, preferably differs somewhat in shape at its end portions from the conventional axle, and differs radically in manner of anchorage in that the swiveled connection with the supporting wheel at each end of the axle is effected without the employment of a stub axle. It will be understood that the two end portions of axle 10 are duplicates of each other, and the description of one equally applies to the other. The end portion 11 of axle 10 is offset at an angle to the main body of the axle, so that the portion 11 extends substantially horizontally and has a free end exposed outwardly and an abrupt shoulder exposed inwardly. The portion 11 is bored axially throughout its length to form a passageway 12 having at its outward portion an enlargement 13, the inward portion of the passageway 12 being preferably cylindrical while the outward portion 13 is polysided, and one convenient form is rectangular in cross section.

The outer or free end portion 27 of the axle section 11 is formed with upper and lower cylindrical, alined pockets 14 and 15 into which extend the pintles or trunnions 30 and 33, respectively, said trunnions being the smooth projecting terminals of the threaded shafts or bolts 31 and 34, respectively, which are threaded into threaded openings 32 and 35, respectively, of a swiveled or oscillatory bearing hub 26, which, for brevity of reference, will be called the swiveled hub. The upper and lower bearing faces of the free terminal portion 27 of section 11 are preferably provided with a cover plate 36 of bearing metal, which is preferably extended in the form of a lining 38 within the respective pockets 14 and 15. The parts 36 and 38 serve as bushings and are renewable to take up excess wear.

The swiveled hub 26 is formed, as clearly seen in Figure 3, with an axial opening to accommodate the free end portion 27 of section 11, the said axial opening having lateral enlargements 102 to permit the hub to swing freely upon its pivots 30 and 33 without interruption by the axle section 11. At the inner end of the swiveled hub 26, the peripheral portion is extended to provide an outstanding peripheral flange, which flange is turned to form a horizontal flange 25, and the outer face of the flange 25 provides a short cylindrical surface at the inner end of the swiveled hub 26, and the outer end of the hub is engaged by an annulus 122 which is detachably connected in any appropriate manner, as by being threaded onto the hub. The swiveled hub 26 is provided with a cylindrical, peripheral surface between the annulus 122 and the flange 25, and engaging such peripheral surface and resting edgewise respectively against the annulus 122 and the flange 25 are bearing raceways on which are mounted any appropriate antifriction bearings 21 and 22 so located as to stress the raceways apart.

An appropriate wheel 16 may be and preferably is of a popular conventional type, and is fixed by bolts 18 to a flange outstanding from a hub 17 which is in the form of a shell adapted to be located to surround and be spaced from the swiveled hub 26, and because the hub shell 17 is an immediate part of wheel 16, the said hub will be hereinafter briefly identified as the wheel hub. The wheel hub 17 includes a radially inwardly-extending partition flange 20 located substantially in the median line of the hub and in planes between the bearings 21 and 22. Bearing raceways are located within and engage the inner surface of the wheel hub 17 in position to edgewise abut against the opposite faces of the partition flange 20 and to engage the bearings 21 and 22 in a manner tending to stress the last-mentioned raceways toward engagement with flange 20. Thus, wheel 16 is rotatively mounted on swiveled hub 26 and through that mounting is swiveled to the axle 10. As a means of excluding dust and other foreign matter and of retaining lubricant, a cover ring 23 is preferably detachably fixed to the wheel hub 17, as by bolts 123. The ring 23 extends inward from hub 17 and is preferably alined with the outwardly-extending portion of flange 25. The ring 23 extends inward to contact with the peripheral surface of flange 25, and extending laterally from the exposed face of ring 23 is a flange 24 having an inwardly-turned flange portion extending to the cylindrical surface of flange 25. An annular chamber 119 is thus provided by the flange 24, the innermost edge portion of ring 23, and the cylindrical surface of flange 25. Felt or other absorbent, fibrous material 120, preferably saturated with lubricant, is disposed in chamber 119. Thus, the bearings for hub 17 are sealed against loss of lubricant or access of foreign matter.

Figure 7:
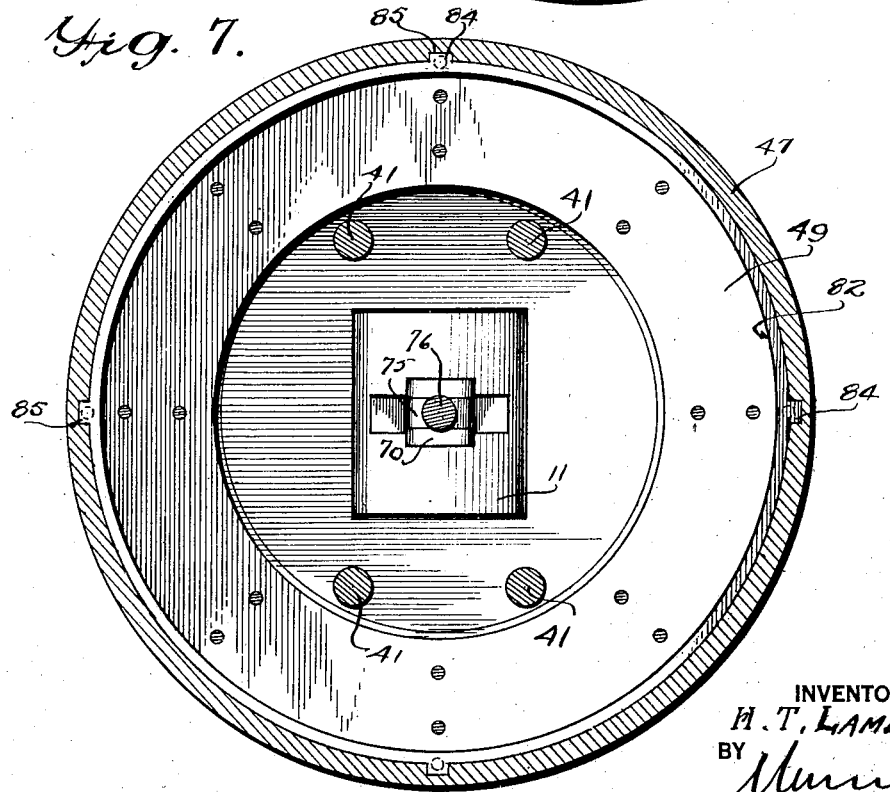
Figure 7 is a vertical section taken approximately on the plane of the outer face of the interposed brake ring, the section being taken substantially on the line 7—7 of Figure 3, and parts being seen in elevation.

Guiding studs 41, 41 are provided with threaded inner end portions threaded into and extending axially outward from the swiveled hub 26. Obviously, studs 41 may be otherwise detachably fixed to the hub. As seen in Figure 7, four of the studs 41 represent a convenient number appropriately spaced, but, of course, a greater or less number may be employed and otherwise spaced as desired. The exposed portions of the studs 41 are smooth to serve as supports and guides for a brake member 46 which is preferably in the form of a disc. Appropriate bushings 50 preferably line the passageways in disc 46 for the studs 41 and snugly engage the studs. Spaced inward from the braking disc 46 is a cooperating braking disc 40, which latter disc is anchored to the swiveled hub 26 by the stud bolts 41 whose threaded portions extend through the disc 40 into the body of the swiveled hub 26. An appropriate shoulder, such as a hexagonal tool-receiving part is preferably formed on each stud 41 at the outer terminus of the threaded portion, so that the said shoulder engages the outer face of the disc 40 and clamps the disc to the outer face of the swiveled hub 26 when the stud is threaded home. The disc 46 is preferably resiliently stressed outward away from disc 40 by any appropriate spring or other elastic means. One form of such stress-producer consists of a plurality of leaf springs 55 fixed to the inner face of disc 46 and extending to the outer face of disc 40 and bowed to remain under spring pressure while the discs 46 and 40 are in their assembled position even when not effecting a braking action, so as to assure separation of the discs 46 and 40 from a braking position when released.

Slidingly mounted in the bore 12 is an operating bar or rod 60 having a head 70 of the same polysided cross section as that of the enlarged portion 13 of the bore, and proportioned to snugly fit therein while free to slide. The outer end portion of the head 70 is bifurcated to provide ears 71 formed with alined apertures 73, and a pin 76 is provided with an eye 75 at its inner end arranged to have the opening 74 of the eye alined with the openings 73, the parts being secured together by an appropriate pintle 72. Thus, pin 76 is free to swing laterally while maintaining its engagement with the draw bar or rod 60, and it is to be observed that the rod 60 is proportioned and located to have the axis of pivotal movement of pin 76 substantially coincident with the axis of the swiveling of wheel 16. Naturally, with reciprocal movement of rod 60 the location of the pintle 72 will be varied, but such variation is sufficiently slight not to interfere with the approximate coincidence of the axes of movement, and, therefore, not to interfere with the successful swinging of bolts 76 without binding. As best seen in Figures 3 and 5, the free or outer end of the enlarged portion 13 of bore 12 opens through the end of the axle section 11, and at such end is enlarged laterally for a portion of its height to provide lateral guideways 80 and 81 into which the pin or bolt 76 may be swung incident to steering movements of the swiveled wheel 16. The outer portion of the pin or bolt 76 extends through the discs 40 and 46. Appropriate openings are, of course, formed in the discs for the passage of the pin 76, as, for instance, the opening 79 is formed centrally in disc 46 to snugly receive the pin. The outer terminus of the pin 76 is provided with threads 77, which are engaged by a nut 78 in position to have the inner face of the nut rest against the outer face of the disc 46, and thus enable an inward thrust of rod 60 to draw the brake disc 46 bodily, axially inward.

A hub cap 51 is located outward of the parts described, and includes a cylindrical drum 47 which extends to and contacts with the flange 19 and is preferably flanged radially to be engaged and detachably secured to flange 19 by the bolts 18. A braking ring 44 is carried by drum portion 47 of hub cap 51 and located between the brake discs 46 and 40. The ring 44 is an annulus of sufficient interior diameter to accommodate the studs 41 and other interposed devices between the discs 40 and 46 without contact with any of said devices, and though the part 44 is distinctively an annulus, because of its similarity to corresponding parts of a disc clutch, the said annulus may be hereinafter referred to as a disc. The outer margin of the annulus 44 terminates in lateral flanges 82 forming a T-head in cross section for the disc or annulus 44, and the diameter of said T-head is sufficiently great to allow the discs 40 and 46 to lie within the flanges 82. The annulus 44 is resiliently stressed toward a non-braking position, that is, outward, by appropriate springs 91 which may have any of various convenient and appropriate forms of construction and arrangement, an acceptable form consisting of providing a series of axially extended recesses in the T-head of the annulus 44 with the recesses opening at the inner edge of said T-head, and with the springs 91 located in the recesses and reacting against the flange 19 to stress the annulus 44 outward. Plungers 90 are also preferably arranged in said recesses and interposed between the springs 91 and the contiguous face of the flange 19 to directly engage said flange and thus enable the reactive stress of springs 91 to be expressed as an outward pressure on the annulus 44. The drum portion 47 of the hub cap is formed with a plurality of radially extended, transverse slots 85, and the annulus 44 is provided with a corresponding number of radially extending lugs 84 proportioned to snugly fit and slidingly engage said slots for permitting the annulus 44 to have free axial bodily movement while being locked to rotate with the hub cap 51 and wheel 16.
Appropriate brake linings 43 and 45 are preferably provided for the annulus 44 and secured thereto in any well known manner, as by the use of hollow rivets 121, or the like. The annulus 44 is preferably shaped in cross section to correspond to a frustum of a cone tapering from its inner periphery, and when the annulus 44 is so shaped, the braking discs 40 and 46 are preferably dished toward their peripheries, as indicated respectively at 42 and 48.
To facilitate access to the nut 78, the hub cap 51 is preferably centrally apertured, at 52, and provided with a threaded outstanding boss 53 engaged by the threaded cap 54.

The inner end portion of the operating draw rod 60 is provided with a high-pitched thread 61, and for purposes of increased purchase (notwithstanding the high pitch of the thread) plural threads are preferably employed, and the threaded portion 61 is engaged by an operating nut 62 extending into the inner end portion of bore 12 and having a conical outer portion 63 providing at its outer end a shoulder abutting the inner end or shoulder of section 11 of axle 10 for resisting longitudinal outward travel of nut 62 whereby, when nut 62 is rotated in a direction for moving outward along rod 60, instead of the nut travelling outward, the said rod is caused to shift inward responsive to the action of the nut and against the action of springs 55 and 91. A crank arm 66 is provided and has its end portion 65 formed with a conical opening proportioned to snugly fit the cone 63 for enabling manipulation of the nut 62 by the swinging of the crank arm 66. To insure movement of nut 62 with crank arm 66, an interlocking, toothed engagement 64, as seen best in Figure 3, may be provided between the arm and cone. The inner extremity of nut 62 is externally threaded and engaged by a nut 68 which clamps the conically-apertured portion of crank arm 66 into a driving fit engagement with the cone 63 and retains the same in such relation. A draw bar 67 engages the free end portion of crank arm 66 and extends to the usual operating lever, such as a foot lever, not illustrated.

While, of course, the braking mechanism, and particularly the braking surfaces, may function effectively in a dry condition, the power with which the braking disc 46 clamps the annulus 44 against the braking disc 40 is sufficient to assure effective clamping action even when the parts are lubricated, and it is, therefore, entirely feasible to supply lubricant, as indicated at 124 in Figure 1, to a liquid level sufficiently high to insure bathing the anti-friction bearings 21 and 22 at the lower part of the hub 17 as the hub revolves. Lubricant will thus be lifted and distributed above the bearings during the course of operation. To provide lubrication for the pintles 30 and 33, appropriate ports and passages may be formed, as, for example, a port 127, as seen in full lines in Figure 3 and in dotted lines in Figure 6, may be caused to intercommunicate the pockets 14 and 15, and will, of course, extend through the bushings to allow access of lubricant between the relatively moving parts. A plug 128 will normally close the upper end of port 127, and may be readily removed for cleaning the port, as desired. Each of pintles 30 and 33 is provided with an axial bore 125, seen in dotted lines in Figure 1, having cross ports 130 at the ends within the pockets 114 and 115, the opposite ends of said ports 125 opening through the outer ends of the respective parts 31 and 34, and the uppermost port 125 is preferably enlarged at its upper end so as to receive lubricant draining from the bearings 21 and 22, and thus lubricant will find its way to the pintle 30 and thence drain through port 127 to pintle 33, and excess lubricant will drain from pintle 33 through the lower port 125 back into the supply lubricant at the lower part of the hub.

The swiveled hub 26 is adapted to be swung upon its pivot by an operating steering link of any well known construction engaging the passageway 100 in eye 101 outstanding inwardly from the inner end of and preferably formed integral with the swiveled hub 26.

It is believed that the operation of the structure will be apparent from the foregoing, and may be briefly stated to consist of the following:

The steering action of wheel 16 incident to swinging movement thereof on trunnions 30 and 33 is effected through any of the well known forms of linkage engaging the eye 101 and enabling the operator to impart a thrust or pull to the eye, according to the direction in which the wheel 16 is to turn. The swiveling or turning action of wheel 16 in no way interferes with the operation of the braking parts, and it should be apparent that other devices than the brake controlling and actuating members 60 and 76 may be substituted when other results are intended, as, for example, a live axle or drive shaft may be passed through the hollow part of axle section 11 with its axis coincident with the axis of rotation of wheel 16, as fully set forth in my co-pending application, Serial No. 445,713, filed April 19, 1930, now Patent No. 1,922,962, dated August 15, 1933, and, in that event, of course, the impartation of a braking thrust to the braking disc 46 must be accomplished by an actuator or actuators otherwise located, as indicated in said co-pending application. The wheel 16 rotates freely on the swiveled hub 26 regardless of the angularity of the hub to axle section 11.

The brake mechanism as illustrated is shifted to and from braking position by oscillations of crank arm 66 and the reactive stresses of springs 55 and 91, and the pivotal connection of pin 76 enables transmission of braking thrusts notwithstanding variation in angularity of the swiveled hub 26 to the axle section 11.

It is to be noted that the nuts of bolts 18 are exposed at the outer face of the wheel 16 in an especially accessible location, so that they may be easily removed and replaced. When said nuts are removed, the cap 51 may be readily withdrawn axially, and the brake parts will thus be exposed and rendered accessible for cleaning, replacement, and relining or other repair. After removal of the cap 51, the brake discs 46 and 44 may be easily withdrawn axially by merely removing nut 78 from pin 76 and removing the cotter pins or other detents from the studs 41. When discs 46 and 44 have been removed, disc 40 may be readily removed by unscrewing the studs 41 from the swiveled hub 26. Upon removal of all these parts, hub 17 will still be retained in operative position by the bearings 21 and 23, their raceways and cooperating parts. It is, however, only necessary to unscrew the ring nut 122 to enable lateral withdrawal of said bearing parts and with them hub 17 and wheel 16. All these parts may be readily restored by a converse assemblage.

It is important, of course, that the pintles or trunnions 30 and 33 be retained during operation against variation in location, and at the same time, to enable assemblage and dismantling of the parts, said trunnions must be detachably mounted. Such detachable mounting may be effected in any of numerous ways, the form illustrated consisting of the employment of threaded engagement of parts, and, in order to prevent possibility of even slight dislocation, keys 126 are employed and set in registering slots in the respective threaded bolts 31 and 34 and in adjacent portions of the swiveled hub 26. When the parts are assembled, one of the bearing raceways surrounds that part of the periphery of swiveled hub 26 through which is exposed the ends of the keys 126, and said keys are, therefore, effectively tied against dislocation.

The enlargement at the outer end of the oil passage 125, while serving with respect to the upper trunnion 30 as a more effective receptacle for the draining oil, in each instance is preferably square or otherwise polysided to serve as a socket for receiving an appropriate tool for threading the part into place and for removing it.

It should be clear from the foregoing that the omission of a stub axle and the provision of a broad bearing for the transmission of load between hub 26 and axle section 11 materially improves the operation of wheel 16 over the action of a swiveled wheel depending upon swiveling from an axis spaced laterally of the wheel as with stub axle construction. The extended line of the pivotal axis of hub 26 is such as to intersect the median line of the tread of wheel 16. Lateral drag, pinching or torsional stress on a king pin and resulting necessity for counterbalancing dishing of the swiveled wheel, as occurs in the use of stub axle constructions, are all obviated by the stated location of the swivel axis and by the engagement of the direct rigid part of the main axle with the wheel structure. This method of mounting of wheel 16, therefore, affords greater ease of steering and longer life of tires than with the dished type. It will be observed that hub 26 is swiveled to swing freely within the limits of the lateral recesses 120 with respect to axle section 11, and such swinging occurs on a vertical axis, but the hub 26 is held perfectly rigid against any vertical inclination, movement, or adjustment out of planes perpendicular to the axis of rotation.

What I claim is:—

1. A device of the character described comprising an axle, a wheel having a hub and a hub section receiving an end of the axle, a bearing located between the hub and the hub section whereby the hub is rotatably mounted on the hub section, the hub section being provided with a central passage and a slot located in a horizontal plane extending in opposite directions from the passage and opening thereinto, pins secured in the hub section and having the free ends thereof projecting into the passage in the hub section, the end of the axle being provided with sockets to receive the free ends of the pins whereby the wheel is oscillatable on said pin, the hub section having an annular flange projecting outwardly from one face and a lateral annular flange projecting from the last mentioned flange, and a flange ring secured to the hub and engaging the last mentioned flange.

2. A device of the character described comprising an axle, a wheel having a hub and a hub section receiving an end of the axle, a bearing located between the hub and the hub section whereby the hub is rotatably mounted on the hub section, the hub section being provided with a central passage and a slot located in a horizontal plane extending in opposite directions from the passage and opening thereinto, pins secured in the hub section and having the free ends thereof projecting into the passage in the hub section, the end of the axle being provided with sockets to receive the free ends of the pins whereby the wheel is oscillatable on said pin, the hub section having an annular flange projecting outwardly from one face and a lateral annular flange projecting from the last mentioned flange, and a flange ring secured to the hub and engaging the last mentioned flange, the flange ring being provided with annular recesses, and a packing located within said recesses.

3. In swiveled wheel construction, the combination, with a rigid axle, of an inner hub section surrounding and swiveled directly to the rigid axle, the swiveling means for said hub section detachably engaging the hub section and axle, an outer rotatable hub section encircling the inner hub section, bearing means between and connecting the hub sections and located to prevent disconnection of the swiveling means, and means outward of the hub sections at the outer face of the wheel for detachably locking the bearing means against dislocation, the last-mentioned means including means for controlling movements of the wheel.

4. In swiveled wheel construction, the combination, with a rigid axle, of an inner hub section surrounding and swiveled directly to the rigid axle, the swiveling means for said hub section detachably engaging the hub section and axle, an outer rotatable hub section encircling the inner hub section, bearing means between and connecting the hub sections and located to prevent disconnection of the swiveling means, and means outward of the hub sections at the outer face of the wheel for controlling movements of the wheel and located and serving to prevent dislocation of the bearing means between the hub sections.

5. In swiveled wheel construction, the combination of a hub section having an axial recess and lateral enlargements opening inward therefrom, the recess and enlargements having horizontally flat faces, a rigid axle comprising a single, integral, transversely rectangular bar extending into and fitting said recess and having correspondingly flat faces in engagement with the flat faces of the recess, means swiveling the hub section to the axle to allow horizontal pivotal movement of the hub section accommodated by movement of the lateral enlargements across portions of the axle, and an outer hub section rotatably mounted on the first-mentioned hub section.

6. In swiveled wheel construction, the combination, with a rigid axle, of an inner hub section surrounding and swiveled directly to the rigid axle, the swiveling means for said hub section detachably engaging the hub section and axle, an outer rotatable hub section encircling the inner hub section, bearing means between and connecting the hub sections and located to prevent disconnection of the swiveling means, and means for detachably locking the bearing means against dislocation, the last-mentioned means including means for controlling the rate of rotation of the wheel.

7. In swiveled wheel construction, the combination, with a rigid axle, of an inner hub section surrounding and swiveled directly to the rigid axle, the swiveling means for said hub section detachably engaging the hub section and axle, an outer rotatable hub section encircling the inner hub section, bearing means between and connecting the hub sections and located to prevent disconnection of the swiveling means, and means outward of the hub sections for controlling the rate of rotation of the wheel and located and serving to prevent dislocation of the bearing means between the hub sections.

HOMER T. LAMBERT.